United States Patent
Morkel et al.

(10) Patent No.: US 9,634,788 B2
(45) Date of Patent: Apr. 25, 2017

(54) OPTICAL COMMUNICATION SYSTEM HAVING LOW LATENCY

(75) Inventors: Paul R. Morkel, Dallas, TX (US); David F. Welch, Atherton, CA (US)

(73) Assignee: Infinera Corporation, Sunnyvale, CA (US)

(*) Notice: Subject to any disclaimer, the term of this patent is extended or adjusted under 35 U.S.C. 154(b) by 594 days.

(21) Appl. No.: 12/875,672

(22) Filed: Sep. 3, 2010

(65) Prior Publication Data

US 2012/0057873 A1    Mar. 8, 2012

(51) Int. Cl.
- H04B 10/00 (2013.01)
- H04J 14/02 (2006.01)
- H04B 10/291 (2013.01)

(52) U.S. Cl.
CPC ...... H04J 14/0221 (2013.01); H04B 10/2916 (2013.01)

(58) Field of Classification Search
CPC ............ H04B 10/2916; H04B 10/2537; H04B 10/506
USPC .................................................. 398/92, 157
See application file for complete search history.

(56) References Cited

U.S. PATENT DOCUMENTS

| | | | | |
|---|---|---|---|---|
| 6,163,636 A * | 12/2000 | Stentz | ................ | H04B 10/2916 359/334 |
| 6,263,139 B1 * | 7/2001 | Kawakami | ......... | G02B 6/02261 385/123 |
| 6,456,426 B1 * | 9/2002 | Bolshtyansky | ......... | H01S 3/302 359/334 |
| 2002/0024722 A1 * | 2/2002 | Tsuzaki | ................... | H01S 3/302 359/334 |
| 2002/0181074 A1 * | 12/2002 | Seydnejad | .......... | H01S 3/06754 359/334 |
| 2003/0076577 A1 * | 4/2003 | Dominic | ............ | H04B 10/2916 359/334 |
| 2003/0170028 A1 * | 9/2003 | Mori | ................... | H04B 10/2537 398/79 |
| 2004/0175187 A1 * | 9/2004 | Eiselt | ................. | H04B 10/2971 398/173 |
| 2004/0208585 A1 * | 10/2004 | Ranka | ................ | H04B 10/2916 398/92 |
| 2005/0177855 A1 * | 8/2005 | Maynard | ............. | H04L 12/2801 725/88 |
| 2008/0145055 A1 * | 6/2008 | Perrier | ................ | H04J 14/0221 398/92 |
| 2008/0298805 A1 * | 12/2008 | Lee | ..................... | H04J 14/0246 398/48 |
| 2009/0128891 A1 * | 5/2009 | Fella | .................. | H04B 10/2916 359/334 |
| 2011/0255874 A1 * | 10/2011 | Watanabe | ............... | G02F 1/395 398/178 |

\* cited by examiner

*Primary Examiner* — David Payne
*Assistant Examiner* — Tanya Motsinger
(74) *Attorney, Agent, or Firm* — David L. Soltz

(57) ABSTRACT

Consistent with the present disclosure, an optical communication system is provided in which client data is input to a first node and output from a second node, spaced from the first node, with little delay. In one example, the delay is reduced by including higher order Raman amplifiers that provide a substantially uniform gain along the length of a fiber optic link, thereby reducing the number of EDFAs that may otherwise be installed along the optical fiber link or eliminating such EDFAs entirely. In another example, FEC encoding and decoding are not employed, thereby reducing the delay even further.

14 Claims, 4 Drawing Sheets

OPTICAL COMMUNICATION SYSTEM HAVING LOW LATENCY

BACKGROUND

Optical communication systems are known in which customer or client data is received at a first node in a network and transmitted or carried by an optical signal to a second node in a network. The client data is then output from the second node. Often, the client data may be encoded in accordance with a forward error correction code (FEC) at the first node and decoded at the second node. Further processing of the client data may be performed in both the first and second nodes.

In addition, if the optical signal is transmitted over relatively long distances in excess of 100 km, optical amplifiers may be provided along one or more optical fiber links connecting the first and second nodes. One common optical amplifier is an erbium doped fiber amplifier (EDFA), which can include one or more coils of erbium doped fiber. As generally understood, if the erbium fiber in the EDFA is suitably pumped with light at 980 nm, for example, a gain may be imparted to the optical signal through stimulated emission.

In so-called "low latency" applications, it is desirable to minimize the time required to output client data from the second node in the network after such data is received at the first node in the network. Optical communication systems having reduced latency are of particular interest in the financial industry, whereby securities trading information and instructions are preferably transmitted from one location or node to another, often over hundreds of kilometers, with little delay.

Conventional optical communication systems, however, include components and features that introduce delay. For example, erbium doped fiber coils in an EDFA can effectively increase the transmission path of the optical signal, thereby delaying the optical signal. In addition, FEC encoding and decoding may introduce further delays. Accordingly, there is a need for optical communication systems in which such delays are minimized or eliminated.

SUMMARY OF THE INVENTION

Consistent with an aspect of the present disclosure, an apparatus is provided that comprises a pump laser, or lasers, configured to supply pump light in a pump wavelength, range, to an optical fiber communication path. The apparatus induces Raman effect optical gain in the transmission fiber itself and thus does not require additional coils of erbium-doped fiber to overcome the optical loss of the fiber transmission medium. The pump light imparts Raman effect optical gain at a first wavelength range spectrally spaced from the pump wavelength by a first Stokes shift. Accumulation of Amplified Spontaneous Emission (ASE) at the first Stokes shift wavelength, or through amplification of an optical seed source, results in buildup of optical power along the fiber in a wavelength range associated with the first Stokes shift. This accumulation of optical power introduces itself Raman gain in a second wavelength range spectrally spaced from the first wavelength by a second Stokes shift, the second wavelength being a signal wavelength. In addition, the apparatus includes a first node that receives a first client signal at a time t1. The first client signal carries client data. The first node is coupled to a first end of the optical communication path and supplies an optical signal at the signal wavelength in response to the client signal. A second node is also provided that is configured to supply a second client signal at time t2 in response to the optical signal. The second client signal carries the client data. A system propagation delay is defined as a difference between t2 and t1. The second node is coupled to a second end of the optical communication path, which includes a plurality of consecutively arranged segments of optical transmission fiber extending from the first node to the second node. A fiber propagation delay being a time period during which the optical signal propagates through the plurality of segments of optical fiber over a distance (D) extending from the first node to the second node, wherein a difference between the system propagation delay and the fiber propagation delay is an equipment propagation delay (Edelay) that satisfies:

$$E\text{delay} \leq D*1.7 \text{ nsec/km,}$$

where D is units of kilometers.

Consistent with an additional aspect of the present disclosure, an apparatus is provided that includes a pump laser, or lasers, configured to supply pump light in a pump wavelength, range to an optical fiber communication path. The pump light imparts Raman effect optical gain at a first wavelength range spectrally spaced from the pump wavelength by a first Stokes shift. Accumulation of Amplified Spontaneous Emission (ASE) at the first Stokes shift wavelength, or through amplification of an optical seed source, results in buildup of optical power along the fiber in the second wavelength range associated with the first Stokes shift. This accumulation of optical power introduces itself Raman gain in a second wavelength range spectrally spaced from the first wavelength by a second Stokes shift. In addition, optical power buildup in the second Stokes shift wavelength range introduces Raman gain in a third wavelength range spectrally spaced from the second wavelength by a third Stokes shift. The third wavelength range encompasses wavelengths carrying information signals to be amplified. Moreover, the apparatus includes a first node that receives a first client signal at a time t1. The first client signal carries client data. The first node is coupled to a first end of the optical communication path and supplies an optical signal at the signal wavelength in response to the client signal. A second node is also provided that is configured to supply a second client signal at time t2 in response to the optical signal. The second client signal carries the client data. A system propagation delay is defined as a difference between t2 and t1. The second node is coupled to a second end of the optical communication path, which includes a plurality of consecutively arranged segments of optical transmission fiber extending from the first node to the second node. A fiber propagation delay being a time period during which the optical signal propagates through the plurality of segments of optical fiber over a distance (D) extending from the first node to the second node, wherein a difference between the system propagation delay and the fiber propagation delay is an equipment propagation delay (Edelay) that satisfies:

$$E\text{delay} \leq D*1.7 \text{ nsec/km,}$$

where D is units of kilometers.

Consistent with a further aspect of the present disclosure, an apparatus is provided that comprises a pump laser configured to supply a pump light to an optical communication path. The pump light imparts Raman gain in a plurality of wavelength ranges associated with cascaded Raman amplification associated with multiple Stokes shifts and successively greater pump propagation distances from first pump ingress point to the optical fiber. Each of the plurality of wavelength ranges is spectrally separated from one another by a corresponding one of a plurality of Stokes shifts. One of the plurality of wavelengths is a signal wavelength. The apparatus also includes a first node that receives a first client signal at a time t1. The first client signal carries client data. The first node is coupled to a first end of the optical communication path and supplies an optical signal at the signal wavelength in response to the client signal. A second node is also provided that is configured to supply a second client signal at time t2 in response to the optical signal. The second client signal carries the client data. A system propagation delay is defined as a difference between t2 and t1. The second node is coupled to a second end of the optical communication path, which includes a plurality of consecutively arranged segments of optical transmission fiber extending from the first node to the second node. A fiber propagation delay being a time period during which the optical signal propagates through the plurality of segments of optical fiber over a distance (D) extending from the first node to the second node, wherein a difference between the system propagation delay and the fiber propagation delay is an equipment propagation delay (Edelay) that satisfies:

$$Edelay \leq D*1.7 \text{ nsec/km},$$

where D is units of kilometers.

Advantages of the present disclosure will be set forth in part in the description which follows, or may be learned by practice of the disclosure. It is to be understood that both the foregoing general description and the following detailed description are exemplary and explanatory only and are not restrictive of the invention, as claimed.

The accompanying drawings, which are incorporated in and constitute a part of this specification, illustrate embodiments of the disclosure and together with the description, serve to explain the principles of the invention.

DESCRIPTION OF THE EMBODIMENTS

Consistent with the present disclosure, an optical communication system is provided in which client data is input to a first node and output from a second node, spaced from the first node, with relatively little delay. In one example, the delay is reduced by including higher order Raman amplifiers that provide a substantially uniform gain along the length of a fiber optic link, thereby reducing the number of EDFAs that may otherwise be installed along the optical fiber link or eliminating such EDFAs entirely. In another example, FEC encoding and decoding are not employed, thereby reducing the delay even further.

Reference will now be made in detail to the present exemplary embodiments of the disclosure, examples of which are illustrated in the accompanying drawings. Wherever possible, the same reference numbers will be used throughout the drawings to refer to the same or like parts.

Figure 1:
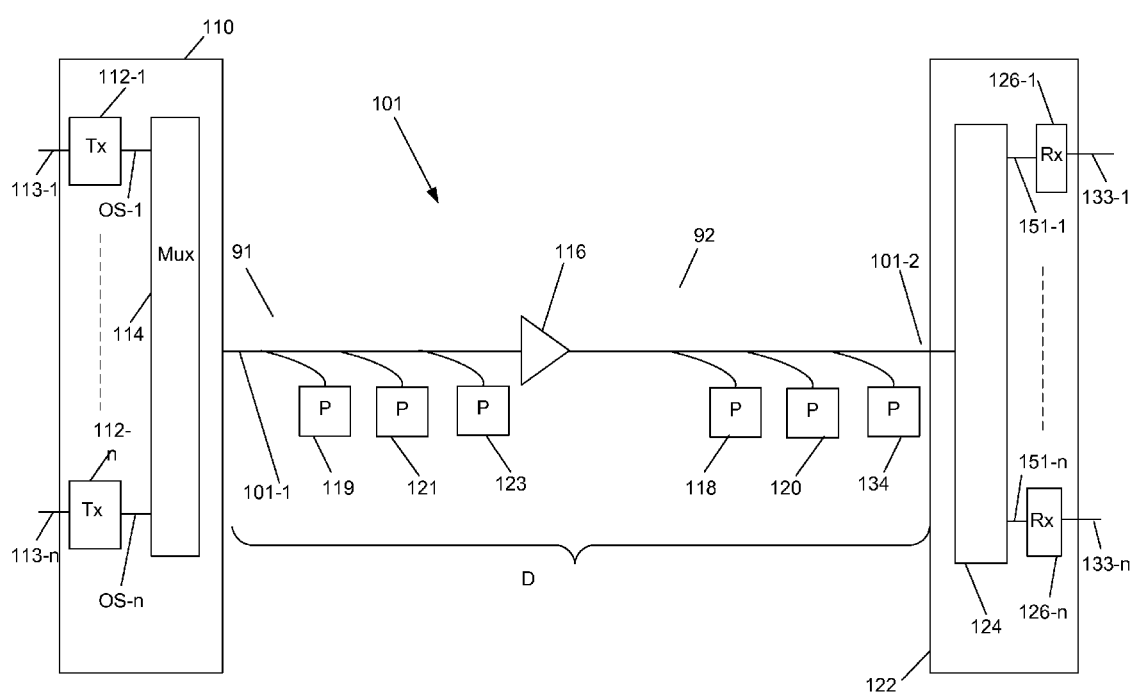
FIG. 1 illustrates an optical communication system consistent with the present disclosure.

FIG. 1 illustrates an optical communication system 100 consistent with an aspect of the present disclosure. Optical communication system 100 includes a first node 110 that may include a plurality of transmitters or transmitter circuits 112-1 to 112-n. Alternatively, one such transmitter may be provided. Each of transmitter circuits 112-1 to 112-n in node 110 may receive a corresponding one of a plurality of client signals 113-1 to 113-n, and each of client signals 113-1 to 113-n carries corresponding client data.

Each of transmitters 112-1 to 112-n may include known circuitry to convert the received client signals 113-1 to 113-n, which may be in optical form, into corresponding electrical signals and process such electrical signals to modulate a corresponding one of output optical signals OS-1 to OS-n. Alternatively, the client signals may be in electrical form, as opposed to being optical. In any event, each of optical signals OS-1 to OS-n is output from a corresponding one of transmitters 112-1 to 112-n in response to client signals 113-1 to 113-n, respectively.

Optical signals OS-1 to OS-n may be supplied to a known optical multiplexer 114 that combines the optical signals into a wavelength division multiplexed (WDM) optical signal that is supplied to optical communication path 101. The WDM optical signal propagates along optical communication path 101, which may include a plurality of consecutively arranged or concatenated segments of optical transmission fiber 91 and 92. Optionally, an erbium doped fiber amplifier (EDFA) 116 may be coupled to optical communication path 101, but the erbium doped fiber in the EDFA may introduce a delay in the propagation of the WDM optical signal. Although two segment of optical transmission fiber are shown in FIG. 1, it is understood that optical communication path 101 may include an appropriate number of optical transmission fiber segments. Optical transmission fiber segments 91 and 92 may include known optical transmission fibers, such as LEAF fiber and SMF-28 fiber commercially available from Corning, Inc.

In order to limit the number of EDFAs that may otherwise be provided along optical communication path 101, and thus limit the optical signal propagation delay associated with sup amplifiers, higher order Raman amplification may be employed in accordance with the present disclosure. For example, three or more Raman pump lasers, such as pump lasers 119, 121, and 123, may be coupled to transmission fiber segment 91 and three or more Raman pump lasers, such as pump lasers 118, 210, and 134 may be coupled to transmission fiber segment 92. Assuming a signal wavelength within the so-called C-ban (1530 nm to 1560 nm), the wavelength of the pump light supplied from each of the pump lasers is selected to provide higher order Raman amplification, as discussed in greater detail below with reference to FIGS. 2-4.

Figure 2:
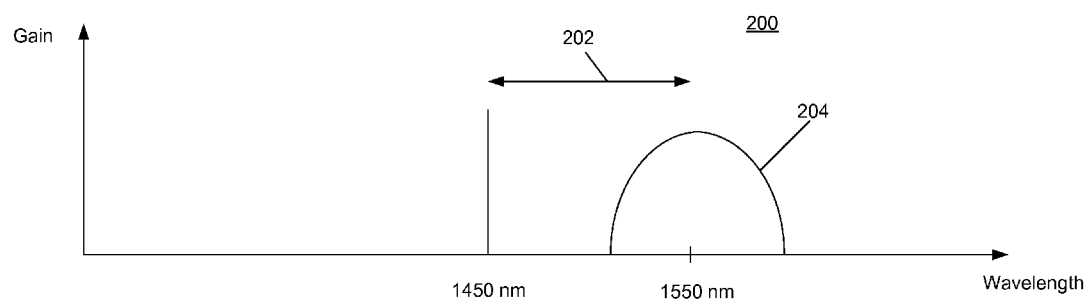
FIG. 2 illustrates a Raman gain spectrum consistent with an aspect of the present disclosure.

FIG. 2 illustrates a Raman gain spectrum 200 associated with first order Raman amplification. Namely, as generally understood, in order to provide Raman gain at the optical signal wavelength, the pump wavelength is preferably spectrally spaced from the optical signal wavelength by a Stokes shift. If the optical signal wavelength is equal to a wavelength in the C-band, such as 1550 nm, the Raman pump laser 119, for example, preferably supplies a pump wavelength that is within a pump wavelength range of 1440 nm-1460 nm, such as 1450 nm and the Stokes shift 202 is about 100 nm. As a result, Raman gain (represented by curve 204) can be achieved at a wavelength of 1550 nm.

Figure 3:
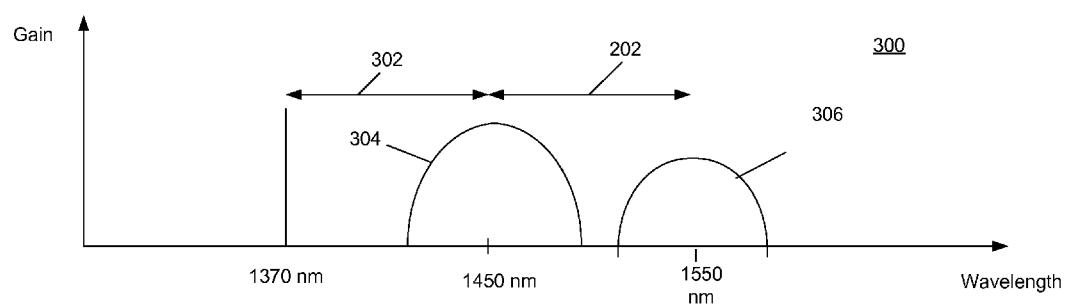
FIGS. 3 and 4 illustrate a higher order Raman gain spectrum consistent with an aspect of the present disclosure.
Figure 4:
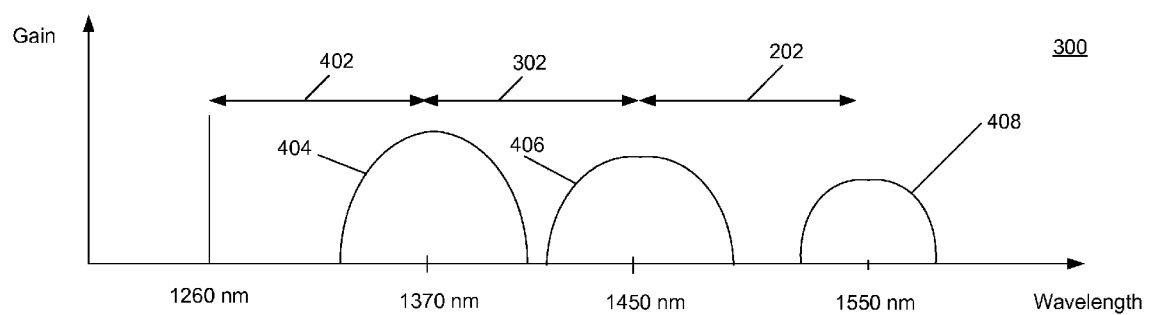

As further understood and, as shown in FIG. 3, the 1450 nm pump light, itself, may be generated by a Raman gain (represented by curve 302) imparted by further or higher order pump light (supplied by pump laser 121, for example) having a wavelength that is spectrally spaced from 1450 nm by a further Stokes shift 302. Namely, pump light having a wavelength in a range of 1360 nm to 1380 nm, such as 1370 nm, may be output from pump laser 123 to impart a Raman gain 304 at 1450 nm, which, in turn, can provide further or Raman gain (represented by curve 306) at 1550 nm.

In yet another example (see FIG. 4), an additional or higher order pump laser 125 may provide pump light at a wavelength (e.g., within a range of 1270 nm to 1290 nm, such as 1280 nm) that is a Stokes shift 402 away from 1370 nm, which, in turn, will impart a Raman gain 404 at 1370 nm. Such Raman gain or Raman generated light imparts a further Raman 406 gain at a Stokes shift 302 away from 1370 nm, such that light at 1450 nm is generated. Such 1450 nm light is a Stokes shift 202 away from 1550 nm, and, therefore, imparts additional Raman gain 408 at the 1550 nm signal wavelength.

Although a specific number of pump lasers and particular pump wavelengths are discussed above, it is understood that any appropriate number of Raman pump lasers may be provided to impart a series of higher order Raman gains at wavelengths that are separated from one another by a corresponding one of a plurality of Stokes shifts. Moreover, pump lasers 119, 121, and 123 are typically provided in a counter-propagating configuration relative to propagation or transmission of the optical signal at 1550 nm. In addition, although the pump wavelengths 1450 nm, 1370 nm, and 1260 nm, in each of FIGS. 2, 3, and 4, respectively, are shown as single wavelengths, it is further understood that pump lasers 119, 121, and 123 may supply Raman pump light over a relatively narrow range about each of these wavelengths. Further, pump lasers 119, 121, and 123, may be either co-located or spaced from one another by any appropriate distance. Likewise, pump lasers 118, 120, and 134 may be similarly co-located or spaced from one another by any appropriate distance.

Figure 5:
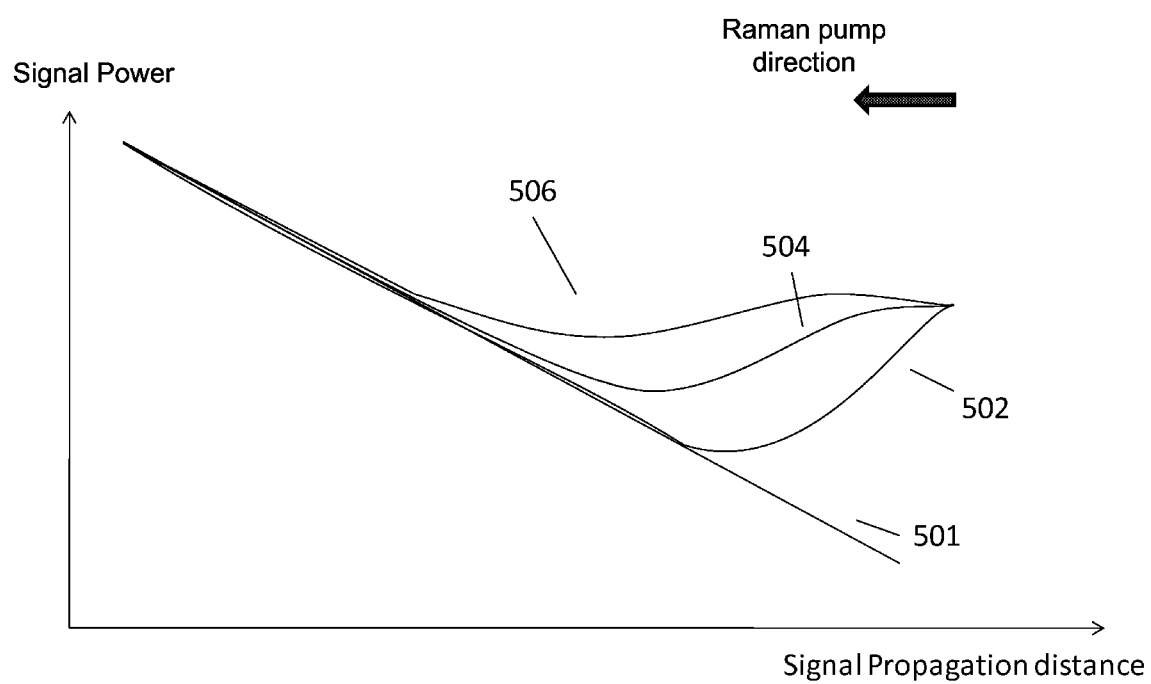
FIG. 5 illustrates plots of pump power vs. distance from receive node consistent with an additional aspect of the present disclosure.

An advantage of the present disclosure will next be described with reference to FIG. 5, which illustrates a series of curves 501, 502, 504, and 506, which show signal power at 1550 nm as a function of distance from a transmitter, such as one of transmitters 112-1 to 112-n. Curve 501 corresponds to no Raman gain, while curve 502 represents first order Raman amplification in which one pump laser (e.g., pump laser 119) is provided that supplies light having a wavelength, such as 1450 nm, that is one Stokes shift away from the optical signal wavelength at 1550 nm. If an additional pump laser (e.g., 121) is provided (second order Raman gain), that supplies pump light having a wavelength of 1370, such additional pump light imparts Raman gain or light at 1450 nm, which, in turn, imparts further Raman gain or light at 1550 nm. The 1450 nm light generated in response to the 1370 nm pump light supplements the 1450 nm light generated by pump laser 119, for example. Accordingly, the distribution of pump light at 1450, as well as the Raman gain at 1550 (a higher order Raman gain) is more evenly distributed along the length of transmission fiber segment 91, for example, such that fewer amplifiers, such as EDFAs are required (see curve 504). The distribution of pump light 1450 nm light, and, therefore Raman gain at 1550 nm, may be further supplemented and, thus, further distributed along the length of fiber segment 91 (see curve 506) by providing an additional pump laser 123 that supplies pump light having a wavelength in a range of 1270 nm to 1290 nm. Such additional pump light provides further higher order Raman gain at 1550 nm in a manner similar to that discussed above in connection with FIG. 4. As a result, since additional Raman gain may be provided that is distributed along the length of fiber segment 91, for example, fewer EDFAs may be required or none at all along that segment. Similar Raman gains can be achieved in transmission fiber segment 92 by supplying pump light from pump lasers 118, 120, and 134, such that the pump wavelengths are similar to or the same as those discussed above.

Accordingly, optical signals, such as the WDM signal noted above, propagating along optical communication path 101 can do so with reduced latency or delay because fewer EDFAs with relatively long erbium doped fibers are needed.

Returning to FIG. 1, the WDM signal output from node 110 is supplied to node 122 after propagating along optical communication path 101, e.g., through segments of transmission fiber 91 and 92, and being subject to higher order Raman amplification. Node 122 includes an optical demultiplexer that separates the incoming WDM signal into the component optical signals, each of which having a corresponding one of a plurality of wavelengths, as noted above. Each of optical signal is supplied from a corresponding one of outputs 151-1 to 151-n to a respective one of receiver circuits 126-1 to 126-n, including, for example, a photodiode and other known components. Each of receiver circuits 126-1 to 126-n, in turn, outputs a corresponding one of client signals 133-1 to 133-n carrying the client data. Typically, each of client signals 133-1 to 133-n is a substantial duplicate of a corresponding one of client signals 113-1 to 113-n discussed above. As further noted above, the present disclosure is not limited to WDM transmission. Rather, one transmitter circuit 112-1 may be provided supplying one signal to optical communication path 101. In that case, demultiplexer 124 may be omitted and one of the receiver circuits, such as receiver circuit 126-1 may be required.

An example in which one optical signal is transmitted along optical communication path 101 will next be described with reference to FIG. 1. In this example, the reduced delay or latency is quantified in terms of an "equipment propagation delay", as discussed in greater detail below. Namely, node 110 receives client signal 113-1 at a time t1. Client signal 113-1 carries client data. As shown in FIG. 1, node 110 is coupled to a first end of 101-1 of optical communication path 1010 and supplies an optical signal at a signal wavelength in response to client signal 113-1.

Node 122, coupled to a second end 101-2 of optical communication path 101 outputs client signal 113-1 at time t2, subsequent to time t1, in response to the optical signal output from node 110. Client signal 133-1 also carries the client data.

Consistent with the present disclosure, a system propagation delay is defined as a difference between t2 and t1, and a fiber propagation delay is defined as a time period during which the optical signal propagates through the plurality of segments of optical transmission fiber (e.g., segments 91 and 92) over a distance (D) extending from node 110 to node 122. A difference between the system propagation delay and the fiber propagation delay is an equipment propagation delay (Edelay), which is the delay attributable to system components and processing, e.g., optical components other than the transmission fiber segments and electronic processing. Preferably, Edelay satisfies:

$$Edelay \leq D*K$$

where D is units of kilometers and K, a propagation constant, is equal to 1.7 nsec/km.

Accordingly, for example, consistent with the present disclosure, an optical transmission path extending from New York to Chicago may include a plurality of segments of concatenated optical transmission fibers extending over a distance (D) of 1606 km. By reducing the number of EDFAs, for example, in a manner similar to that discussed above, a relatively low propagation constant of 1.7 nsec/km can be achieved, such that the resulting Edelay can be less than 2730 nsec (2.73 microseconds). Further reductions in Edelay can be achieved by not forward error correction (FEC) encoding and not FEC decoding the client data. Accordingly, since systems consistent with the present disclosure have relatively low Edlays, as well as low propagation constants, improved low latency systems can be realized.

Other embodiments of the invention will be apparent to those skilled in the art from consideration of the specification and practice of the invention disclosed herein. For example, the present disclosure is not limited to optical signal wavelengths in a range of 1530 nm to 1560 nm, as discussed above. Rather, optical signal wavelengths in other ranges are also contemplated, such as 1580 nm to 1600 nm, as well as 1600 nm to 1660 nm. It is understood, however, that if such alternative optical signal wavelengths are employed, corresponding changes in pump wavelengths may also be required to provide adequate Raman and higher order Raman gains. It is intended that the specification and examples be considered as exemplary only, with a true scope and spirit of the invention being indicated by the following claims.

What is claimed is:

1. An apparatus, comprising:
    first and second segments of optical fiber, the first segment of optical fiber being in optical communication with the second segment of optical fiber;
    a first pump laser configured to supply first pump light having a first pump wavelength to a first segment of optical fiber, the first pump light imparting a first Raman gain at a first wavelength spectrally spaced from the first pump wavelength by a first Stokes shift, such that the first Raman gain imparts a second Raman gain at a second wavelength spectrally spaced from the first wavelength by a second Stokes shift, the second wavelength being a signal wavelength;
    a second pump laser configured to supply second pump light having a second pump wavelength to the first segment of optical fiber, the second pump light imparting a third Raman gain at the first pump wavelength and the second pump wavelength being spectrally spaced from the first pump wavelength by a third Stokes shift;
    a third pump laser configured to supply third pump light having the first pump wavelength to the second segment of optical fiber, the third pump light imparting a fourth Raman gain at the first wavelength, such that the fourth Raman gain imparts a fifth Raman gain at the signal wavelength;
    a fourth pump laser configured to supply fourth pump light having the second pump wavelength to the second segment of optical fiber, the fourth pump light imparting a sixth Raman gain at the first pump wavelength;
    a first node that receives a first client signal at a time t1, the first client signal carrying client data, the first node being coupled to an end of the first segment of optical fiber and supplying an optical signal at the signal wavelength in response to the client signal;
    a second node configured to supply a second client signal at time t2 in response to the optical signal, the second client signal carrying the client data, a system propagation delay being a difference between t2 and t1, the second node being coupled to an end of the second segment of fiber,
    wherein the first and second pump lasers are spaced from one another along the first segment of optical fiber, such that only the first pump light is supplied at a first location along the first segment of optical fiber and only the second pump light is supplied at a second location, different than the first location, along the first segment of optical fiber, and the third and fourth pump lasers are spaced from one another along the second segment of optical fiber, such that only the third pump light is supplied at a first location along the second segment of optical fiber and only the fourth pump light is supplied at a second location along the second segment of optical fiber different than the first location along the second segment of optical fiber, each of the first and second pump lights counter-propagates in the first segment of optical fiber relative to an optical signal having the signal wavelength, each of the third and fourth lights counter-propagates in the second segment of optical fiber relative to the optical signal.

2. An apparatus in accordance with claim 1, wherein the signal wavelength is within a range of 1530 nm to 1560 nm.

3. An apparatus in accordance with claim 1, wherein the signal wavelength is within a range of 1580 nm to 1600 nm.

4. An apparatus in accordance with claim 1, wherein the signal wavelength is within a range of 1600 nm to 1660 nm.

5. An apparatus in accordance with claim 1, further including an erbium doped fiber amplifier coupled along the optical communication path.

6. An apparatus in accordance with claim 1, wherein optical signal carrying data that is not forward error correction (FEC) encoded.

7. An apparatus in accordance with claim 1, wherein the first pump wavelength is in a range of 1360 nm to 1380 nm and the first wavelength is within a range of 1440 to 1460 nm.

8. An apparatus, comprising:
    first and second segments of optical fiber, the first optical segment of optical fiber being in optical communication with the second segment of optical fiber;
    a first plurality of pump lasers, each of which configured to supply a corresponding only one of a first plurality of pump lights at a respective one of a plurality of locations along the first segment of optical fiber, each of the first plurality of pump lights having a corresponding one of a plurality of pump wavelengths and imparting each of a respective plurality of Raman gains at a corresponding one of a plurality of gain wavelengths, each of the plurality of gain wavelengths being spectrally separated from one another by a corresponding one of a plurality of Stokes shifts, each of the first plurality of pump lights being transmitted in a counter-propagating direction relative to a transmission direction of an optical signal in the first segment of optical fiber;
    a second plurality of pump lasers, each of which configured to supply a corresponding only one of a second plurality of pump lights to the second segment of optical fiber, each of the second plurality of pump lights having a corresponding one of the plurality of pump wavelengths, the first plurality of pump lasers at a respective one of a plurality of locations along the second segment of optical fiber and the second plurality of pump lasers being spaced from one another along the second segment of optical fiber, each of the second plurality of pump lights being transmitted in a counter-propagating direction relative to a transmission direction of the optical signal in the second segment of optical fiber;

a first node having an input that receives a first client signal at a time t1, the first client signal carrying client data, the first node being coupled to an end of the first segment of optical fiber and supplying an optical signal at a signal wavelength in response to the client signal;

a second node configured to supply a second client signal at time t2 in response to the optical signal, the second client signal carrying the client data, a system propagation delay being a difference between t2 and t1, the second node being coupled to an end of the second segment of optical fiber.

9. An apparatus in accordance with claim 8, wherein the signal wavelength is within a range of 1530 nm to 1560 nm.

10. An apparatus in accordance with claim 8, wherein the signal wavelength is within a range of 1580 nm to 1600 nm.

11. An apparatus in accordance with claim 8, wherein the signal wavelength is within a range of 1600 nm to 1660 nm.

12. An apparatus in accordance with claim 8, further including an erbium doped fiber amplifier coupled along the optical communication path.

13. An apparatus in accordance with claim 8, wherein the optical signal carries data that is not forward error correction (FEC) encoded.

14. An apparatus in accordance with claim 8, wherein the first node supplies a wavelength division multiplexed optical signal to the first segment of optical fiber.

* * * * *